United States Patent [19]
Luedtke

[11] 3,967,496
[45] July 6, 1976

[54] TRACTOR PULL SLED
[76] Inventor: Lloyd A. Luedtke, P. O. Box 123, Allenton, Wis. 53002
[22] Filed: Mar. 13, 1975
[21] Appl. No.: 557,916

[52] U.S. Cl. ............................................. 73/141 R
[51] Int. Cl.² ............................................ G01L 5/13
[58] Field of Search ....................... 73/133 R, 141 R

[56] References Cited
UNITED STATES PATENTS

| | | | |
|---|---|---|---|
| 1,603,521 | 10/1926 | Davidson et al. | 73/141 R |
| 3,659,455 | 5/1972 | Watkins | 73/141 R |
| 3,667,291 | 6/1972 | Peak | 73/141 R |
| 3,741,010 | 6/1973 | Luedtke | 73/141 R |

*Primary Examiner*—Charles A. Ruehl
*Attorney, Agent, or Firm*—Michael, Best & Friedrich

[57] ABSTRACT

Disclosed herein is a device adapted to be pulled by a tractor, which device comprises an elongated frame having forward and rearward ends, wheels supporting the rearward end of the frame for travel along the ground, a mass movable on the frame between the forward and rearward ends, a sled having a relatively large ground engaging surface, a guideway on the sled and a slide located on the forward end of the frame and movable in the guideway in the fore and aft direction and adjustably connected to the guideway, and a connector on the sled adapted for attachment to the tractor for pulling of the device by the tractor along the ground.

9 Claims, 4 Drawing Figures

U.S. Patent July 6, 1976 3,967,496
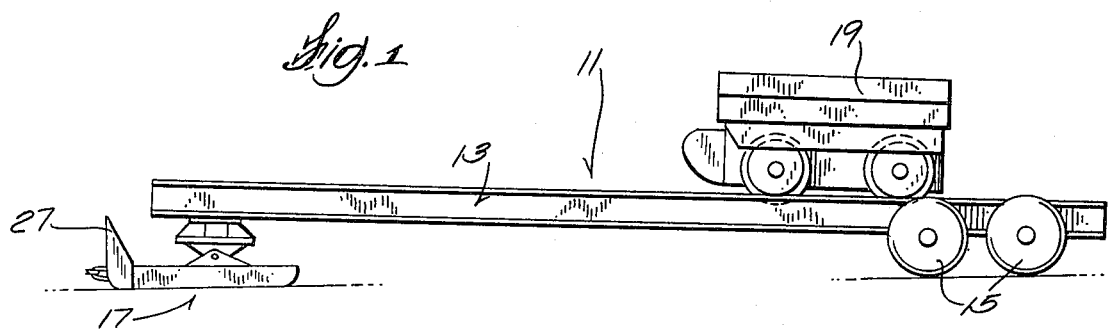
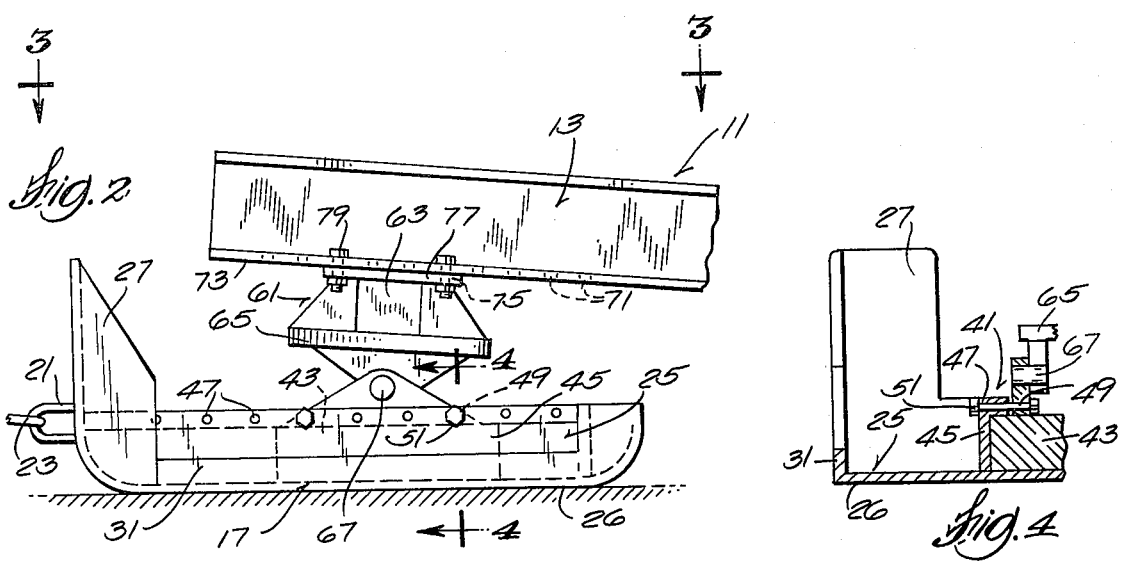
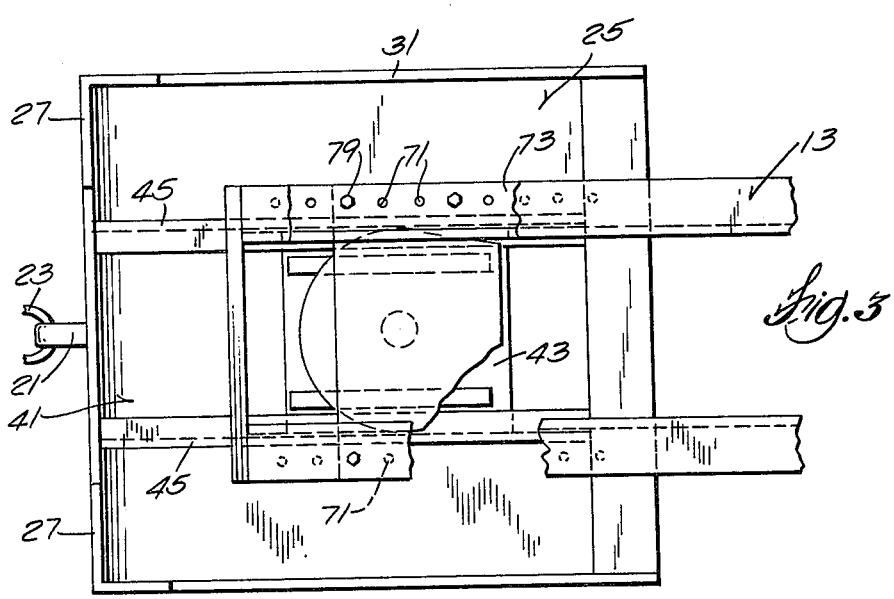

ics employed in so-called tractor pulling contests wherein several tractors are successively connected to a device in which a load is shifted along a frame from over a set of ground engaging wheels supporting the rearward end of the frame to over a ground engaging sled which supports the forward end of the frame and is adapted to be pulled by a tractor. Movement of the weight toward the sled gradually increases the resistance offered to the tractor by the device being pulled. The relative pulling power of competing tractors can readily be determined by measurement of the respective distances through which each of the tractors was able to pull the device.

Reference is made to my U.S. Pat. No. 3,741,010 issued June 26, 1973 and incorporated herein by reference. This application discloses subject matter which constitutes an improvement to the subject matter disclosed in U.S. Pat. No. 3,741,010.

SUMMARY OF THE INVENTION

The invention provides a device adapted to be pulled by a tractor, which device comprises an elongated frame having forward and rearward ends, wheel means supporting the rearward end of the frame for travel along the ground, a mass movable on the frame between the forward and rearward ends, a sled having a ground engaging surface, means on the sled and on forward end of the frame for adjustable connection therebetween in the fore and aft direction, and means on the sled adapted for attachment to the tractor for pulling of the device by the tractor along the ground.

In one embodiment of the invention, the adjustable connection between the sled and the frame comprises a guideway on the sled extending in the fore and aft direction, an element connected to the forward end of the frame and movable in the guideway, and means releasably and adjustably locating the element in the guideway.

In one embodiment of the invention, the device further includes a fifth wheel coupling unit including a first part fixed to the forward end of the frame, and a second part releasably connectable with the first part and supported from the sled for pivotal movement about a transverse axis, and the adjustable connection between the sled and the frame includes means connecting the frame and the first part of the fifth wheel coupling unit for releasably and adjustably locating the first part relative to the frame in the direction between the forward and rearward ends of the frame.

One of the principal features of the invention is a pulling device including means for adjustably locating the sled relative to the forward end of the frame.

Another of the principal features of the invention is the provision of a pulling device including dual means for adjustably locating the sled relative to the forward end of the frame.

Other features and advantages of the invention will become known by reference to the following description and claims.

IN THE DRAWINGS

FIG. 1 is a partially schematic, side elevation view, of a device embodying various of the features of the invention.

FIG. 2 is an enlarged fragmentary side elevational view of a portion of the device shown in FIG. 1.

FIG. 3 is a fragmentary top view with parts broken away, taken generally along the lines 3—3 of FIG. 2.

FIG. 4 is a fragmentary sectional view taken generally along the lines 4—4 of FIG. 2.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Illustrated in the drawings is a device 11 which is adapted to be pulled by a tractor (not shown) in a tractor pulling contest and which includes an elongated frame 13 which is supported, at the rearward end thereof, by a suitable set of wheels 15, which is supported, at the forward end thereof, by a ground engaging sled 17, and which supports a movable mass or weight in the form of a weighted cart 19 movable along the frame 13 in the direction between the forward and rearward ends thereof in response to movement of the device 11 over the ground so as to progressively shift the weight of the cart 19 from the rearward wheels 15 to the forward sled 17 and thereby progressively increase the power required to pull the sled 17 along the ground.

The sled 17 includes suitable means for connection to the tractor so as to pull the sled 17 and attached device 11 over the ground. In the illustrated construction, such means comprise a hook adapted to be connected to a chain 23 which, in turn, is connected to the tractor.

The sled 17 also includes a relatively large base 25 which includes a ground engaging surface 26 adapted to slide along the ground. At its forward end, the sled 17 includes a pair of laterally spaced upstanding wall means 27 which are located more or less directly behind the rear wheels of the tractor. The sled 17 also includes an upstanding peripheral wall 31 extending around the sides and rear of the sled 17 for facilitating loading onto the sled 17 of such weight or mass as may be desired.

In order to more readily adapt the device to tractors of different capacities and to allow for variation in the ground over which the device 11 is pulled and for other variations in conditions during tractor pulling contests, means are provided for adjustably connecting the sled 17 to the forward end of the frame 13 to permit adjustment therebetween in the direction extending between the forward and rearward ends of the frame 13. While various arrangements could be employed, in the illustrated construction, such means comprises a guideway 41 located centrally on the sled 17 and extending fore and aft, together with an element or slide 43 located in the guideway 41 and connected to the forward end of the frame 13 as will be explained hereinafter.

Means are also provided for adjustably securing the slide to the guideway 41. While various arrangements can be employed, in the illustrated construction, the guideway 41 includes a pair of laterally spaced upstanding flanges 45, each of which includes a plurality of transverse bores 47, spaced from one another in the fore and aft direction. The slide 43 includes, on each side thereof, one or more apertures 49 which are individually selectively registerable with one of the bores 47 in accordance with the position of the slide 43 in the guideway 41.

Also included are means extending in the apertures 49 and in the registering bores 47 for releasably preventing movement of the slide 43 relative to the sled 17 in the fore and aft direction. While various means can be employed, in the illustrated construction, one or more keepers 51 are employed. If desired, through bolts (not shown) could be employed.

In order to facilitate over-the-road travel, the device 11 includes a fifth wheel coupling unit 61 including a first part 63 connected to the forward end of the frame 13 and adapted to be received on a mating second part 65 connected to the slide 43 by pivot means 67 affording tilting of the second part 65 relative to the slide 43 about a transverse axis.

In order to further facilitate lengthwise adjustment between the frame 13 and the sled 17, the means for adjustably connecting the frame 13 to the sled 17 also includes means connecting the first part 63 of the fifth wheel coupling unit 61 to the frame 13 for adjustment therebetween in the fore and aft direction. While various arrangements can be employed, in the illustrated construction, such means comprises a plurality of vertically extending bores 71 spaced in the fore and aft direction on each of a pair of outer flanges 73 on the frame 13, together with, for each plurality of bores 71, one or more vertical apertures 75 located in a plate member or attachment portion 77 of the first part 63 of the fifth wheel coupling unit 61 and suitable means extending in the apertures 75 and registering bores 71 for releasably fixing the attachment portion 77 of the first part 63 of the fifth wheel coupling unit 61 to the frame 13 in adjusted position lengthwise of the frame 13. While various arrangements can be employed, in the illustrated construction, such means comprises, on each side of the frame, one or more through bolts 79 extending through the registering apertures 75 and bores 71.

Thus, in the disclosed construction, there is provided two independent arrangements for adjusting the position of the sled 17 relative to the frame 13 in the fore and aft direction, thereby enabling accommodation of the device 11 to tractors of varying capacity. In this regard, shifting of the relation of the sled 17 relative to the frame 13 affects the pulling power required to pull the device 11 along the ground and the length of travel before the tractor's capacity to pull is exhausted. In addition, the peripheral wall 31 of the sled 17 facilitates storage on the sled 17 of variable amounts of weight or mass to further accommodate the device 11 to various tractor pulling contest conditions.

Various of the features of the invention are set forth in the following claims.

What is claimed is:

1. A device adapted to be pulled by a tractor, said device comprising an elongated frame having forward and rearward ends, wheel means supporting said rearward end of said frame for travel along the ground, a mass movable on said frame between said forward and rearward ends, a sled having a ground engaging surface, means on said sled and on said forward end of said frame for adjustable connection therebetween in the direction between said forward and rearward ends, said connection means comprising a way on one of said sled and said forward end of said frame extending in the direction between said forward and rearward ends, an element connected to the other of said sled and said forward end of same frame and movably located on said way, and means releasably and adjustably locating said element on said way, and means on said sled adapted for attachment to the tractor for pulling of the device by the tractor along the ground.

2. A device in accordance with claim 1 wherein said adjustable connection means includes a fifth wheel coupling unit including a first part fixed to said forward end of said frame, and a second part releasably connectable with said first part, and means supporting said second part from said sled for pivotal movement about a transverse axis.

3. A device in accordance with claim 2 wherein said adjustable connection means on said sled and on said forward end of said frame includes means connecting said frame and said first part of said fifth wheel coupling unit for releasably and adjustably locating said first part relative to said frame in the direction between said forward and rearward ends of said frame.

4. A device in accordance with claim 3 wherein said means connecting said frame and said first part of said fifth wheel coupling unit comprises a plurality of bores in one of said frame and said fifth wheel coupling unit first part and an aperture registerable selectively with one of said bores, and means removably extending in said aperture and in the registering one of said bores for releasably fixing said frame and said first part of said fifth wheel coupling unit against relative movement in the direction between said forward and rearward ends of said frame.

5. A device in accordance with claim 1 wherein said sled has a forward end and includes wall means extending upwardly from said forward end.

6. A device adapted to be pulled by a tractor, said device comprising an elongated frame having forward and rearwards ends, wheel means supporting said rearward end of said frame for travel along the ground, a mass movable on said frame between said forward and rearward ends, a sled having a ground engaging surface, means on said sled and on said forward end of said frame for adjustable connection therebetween in the direction between said forward and rearward ends, said connection means comprising a guideway on said sled extending in the fore and aft direction, an element connected to said forward end of said frame and movable in said guideway, and means releasably and adjustably locating said element in said guideway, and means on said sled adapted for attachment to the tractor for pulling of the device by the tractor along the ground.

7. A device in accordance with claim 6 wherein said means adjustably locating said element in said guideway includes a plurality of transversely extending bores in one of said element and said guideway, a transverse aperture in the other of said guideway and said element, said aperture being registerable selectively with one of said bores, and a keeper removably extending in said aperture and in the registering one of said bores for releasably preventing relative movement between said element and said guideway.

8. A device adapted to be pulled by a tractor, said device comprising an elongated frame having forward and rearward ends, wheel means supporting said rearward end of said frame for travel along the ground, a mass movable on said frame between said forward and rearward ends, a sled having a relatively large ground engaging surface, a guideway on said sled extending in the direction between said forward and rearward ends of said frame, an element movable in said guideway, means releasably and adjustably locating said element in said guideway, a fifth wheel coupling unit including a first part, and a second part releasably connectably with said first part, means connecting said frame and said first part of said fifth wheel coupling unit for releasably and adjustably locating said first part relative to said frame in the direction between said forward and rearward ends of said frame, means for supporting said second part of said fifth wheel coupling unit from said element for pivotal movement about a transverse axis, and means on said sled adapted for attachment to the tractor for pulling of the device by the tractor along the ground.

9. A device in accordance with claim 8 wherein said sled has a forward end and including wall means extending upwardly from said forward end.

* * * * *